United States Patent Office 3,088,215
Patented May 7, 1963

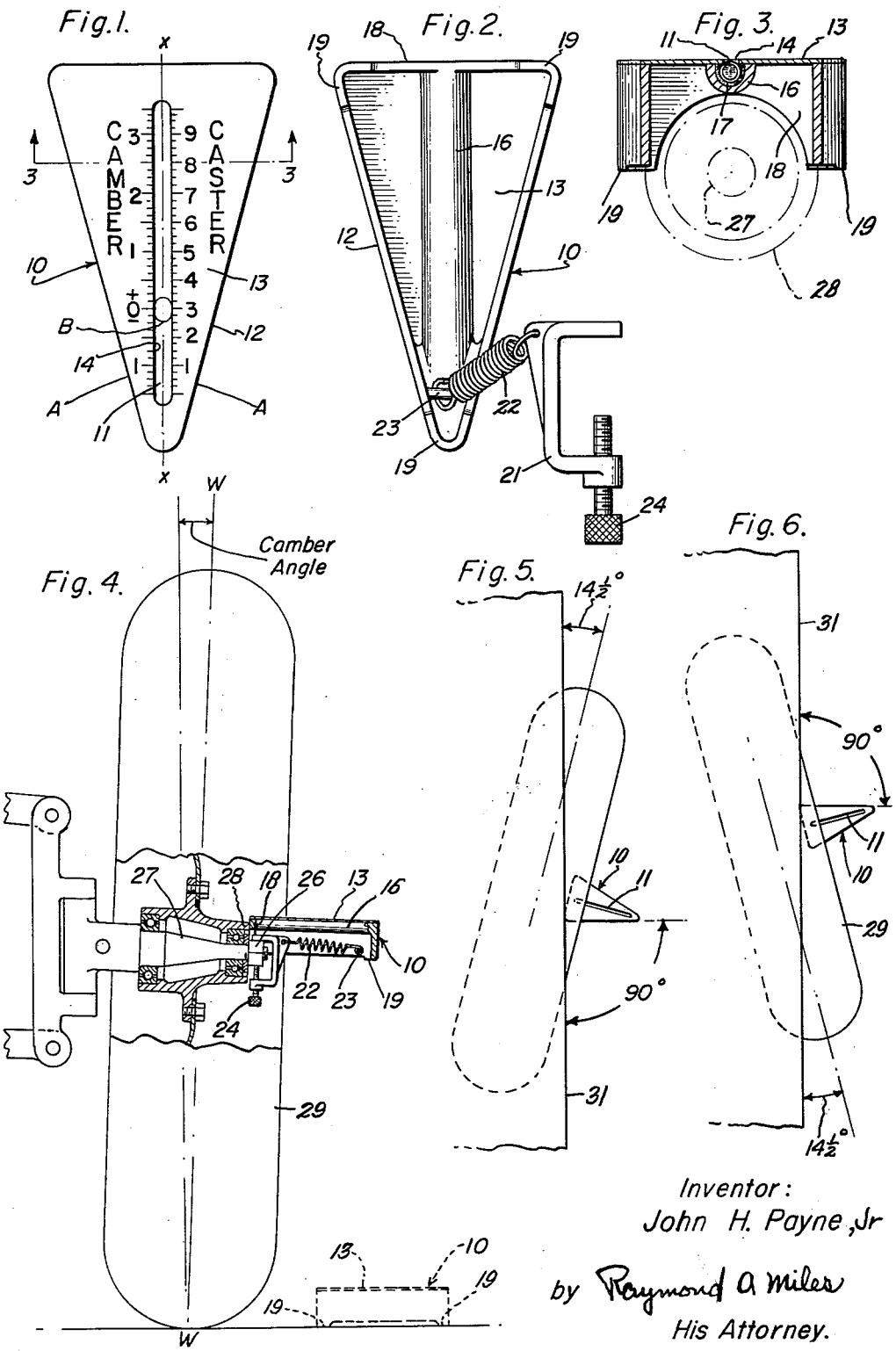
May 7, 1963  J. H. PAYNE, JR  3,088,215
WHEEL CAMBER AND CASTER GAUGE
Filed April 28, 1958
Inventor:
John H. Payne, Jr
by Raymond A. Miles
His Attorney.

3,088,215
WHEEL CAMBER AND CASTER GAUGE
John H. Payne, Jr., 79 West St., Ballston Spa, N.Y.
Filed Apr. 28, 1958, Ser. No. 731,320
4 Claims. (Cl. 33—203.18)

My invention relates to wheel camber and caster gauges.

The principal object is to provide an improved multi-calibrated and self-aligning form of elongated arcuate bubble level gauge unit that can be readily and accurately applied and needs no relatively adjustable or movable parts except the bubble to measure both the camber and caster of any pivoted axle mounted wheel such as commonly employed for steering automobiles or other vehicles.

The optimum camber and caster angles, even though relatively small, are carefully predetermined in designing the front wheel suspension and steering mechanism of each automobile. Hence it becomes important throughout the life of each vehicle frequently and accurately to check for the recommended camber, i.e., the degree that each front wheel tilts outward or inward at the top, and the recommended caster, i.e., the degree of tilt (usually backward) of the kingpin pivot of each front wheel, in order to ensure their optimum smoothness in running and steering. If any appreciable departure from the specified combination of camber and caster angles should be produced by road shock or other accidental bending or twisting of the wheel suspension parts, then erratic and unsafe steering with failure to recover properly from turns, excessive tire wear, and undesirable transmission of road shock are likely to result.

Heretofore, many forms of wheel camber and caster gauges have been proposed. But such prior devices, if made sufficiently accurate, usually have required a number of relatively adjustable or movable parts that were either too complicated and expensive or too delicate and difficult to apply and properly align and adjust for precision use except by specially trained and skilled mechanics.

Thus among the further objects of my invention are not only a more rugged, simplified, and inexpensive form of camber and caster gauge but more particularly an improved practically error proof multi-calibrated single bubble level gauge unit capable of self alignment for accurate use by almost anyone.

In accordance with the principles of my invention, an elongated sensitive arcuate bubble or spirit level is provided with a multi-calibration integral housing structure having coordinated means as described hereinafter for mounting the level on a pivoted axle mounted wheel with the axis of the level aligned parallel with the axis of the wheel. The multi-calibration integral housing structure has three functions. One is to provide a scale for calibrating the level to indicate camber by the bubble reading when the wheel is in a straight ahead direction on a level floor. The second is to provide another scale for calibrating the level to indicate caster by the difference between the bubble readings upon predetermined equiangular deviations of the wheel each way from such straight ahead direction. The third function is to provide equiangular guide elements on opposite sides of the level for easy and accurate successive alignment perpendicular to the straight ahead direction of the wheel, thereby plainly indicating such deviations as opposite halves of the interior angle between the elements to ensure accurate bubble readings in determining caster. In order to accomplish this result the caster scale must be calibrated as the sum of a geometrical function of the opposite halves of the apex angle of the equiangular guides.

In the preferred form of my invention, the elongated sensitive arcuate bubble level is provided with a supporting and protective integral housing or frame that is only slightly longer than the level and is in the form of an isosceles triangle or wedge shaped open bottom box unit having the calibration structure or plate forming the upper face thereof. This open bottom box unit carries the spirit or arcuate bubble level, permanently fixed in position thereon, preferably embedded below the upper face thereof to protect against breakage, with the plane of curvature of the level exactly in alignment with the major axis of the triangle or wedge, thereby bisecting the apex angle. A suitable screw clamp, that can easily be inserted into the triangular box frame unit through the open bottom thereof after being fastened to the ordinary bearing adjustment nut at the outer end of the wheel pivoted axle, is resiliently interconnected by means of a tension spring with the apex of the frame. The base or third side of the triangular or wedge frame constitutes a planiform mounting surface exactly perpendicular to the plane of curvature of the level. Such mounting surface therefore becomes self adjusting against the outer hub of the wheel under the tension of the spring thereby always maintaining the plane of curvature of the level aligned parallel with the axis of the wheel and consequently perpendicular to the plane of the wheel.

The multi-calibration top cover plate forming the upper face of the unit, being of isosceles triangular shape, is provided with a slot extending down the middle for exposing the embedded bubble level tube. An elongated and therefore accurately readable scale is extended on one side of the slot to calibrate the elongated sensitive level to read camber directly with each front wheel straight ahead on a level floor and equally inflated. A second scale extended on the other side of the slot is especially proportioned as a geometric function of the apex angle of the equiangular guide elements of the unit so as to calibrate the elongated sensitive level to indicate the wheel caster by the difference between the two bubble readings upon equiangular deviation of the wheel each way from the straight ahead direction. This can be accomplished easily and accurately even by an inexperienced person merely by turning the wheel until each side of the improved triangular or wedge shaped gauge unit is perpendicular to the straight ahead direction of the wheel as shown in FIGS. 5 and 6, i.e. to the side of the automobile.

The novel features which are believed characteristic of my invention are set forth in the appended claims. The invention itself, together with further objects and advantages thereof, may best be understood by referring to the following description taken in connection with the accompanying drawings of a preferred embodiment in which:

FIG. 1 is a top view of the wheel camber and caster gauge unit showing the plane of curvature x—x of the elongated sensitive arcuate bubble level bisecting the apex angle of its symmetrical triangular or wedge shaped supporting housing or frame and calibrating structure.

FIG. 2 is a bottom view of the open bottom triangular box frame unit with the screw clamp and tension spring removed from the interior thereof preparatory to mounting on the wheel.

FIG. 3 is a sectional view of the unit on the line 3—3 of FIG. 1 indicating by the dotted lines how the arched base of the unit straddles the axle to engage with the outer hub of the wheel.

FIG. 4 is a view, partly in section, of the unit biased by the tension spring into self aligning abutting engagement with the hub of the wheel.

FIGS. 5 and 6 are schematic views showing how the wheel may be equiangularly turned outwardly and inwardly to align the opposite sides of the improved multi-calibrated unit perpendicular to the straight ahead of the automobile in determining caster.

Referring to FIG. 1, the invention is shown in its preferred form as comprising the wheel camber and caster gauge unit 10 having an elongated sensitive bubble or spirit level 11 mounted in a slightly longer supporting housing or frame 12 of isosceles triangular or wedge shape and provided with an upper calibration plate 13 of precisely the same triangular or wedge shape as the frame 12 so that the edges of the plate as well as the sides of the frame constitute equiangular guide elements that can be easily and accurately aligned perpendicular to the straight ahead direction of the wheel as pointed out hereinafter. The calibration plate 13 has inscribed on opposite sides of the central slot 14 the camber and caster scales accurately correlated as also explained hereinafter for calibrating the level 11.

As more clearly shown in FIGS. 2 and 3, the frame 12 may be in the form of a casting, preferably aluminum, or other light metal, provided with a central concave rib 16 to form a groove for receiving the plaster of Paris or other plastic material 17 in which the bubble level 11 is embedded with the plane of curvature of the level perpendicular to the arched base 18 of the frame 12 as well as bisecting the apex angle A as indicated by the line $x—x$ in FIG. 1. Such relationship is required to bring the bubble B to the zero point of the camber scale whenever the calibration criterion of the level is attained, as for example when the three feet 19 of frame 12 rest on a level surface or floor, or the base 18 lies in a vertical plane. The calibration plate 13 may be suitably secured to the frame 12 as by soldering with the middle slot 14 therein extending lengthwise of the level 11 so that the varying position of the bubble B may be easily read through the slot.

In order to ensure self-alignment when the gauge unit 10 is applied to measure the camber or caster of a wheel, a screw clamp 21 of the usual C type is interconnected by the tension spring 22 and pin 23 with the apex of the triangular or wedge shaped frame 12, as shown in FIG. 2. Normally these parts are stored inside the open bottom triangular box frame 12 until it is desired to use the gauge.

In the practical use of the gauge 10 the levelness of the floor is first checked as indicated by the dotted lines. Then the screw clamp 21 is applied in the manner indicated in FIG. 4 to grip the wheel bearing adjustment nut 26 at the outer end of the pivoted axle 27 by turning the screw 24. The spring 22 can then be tensioned and inserted into the triangular box frame 12 through the open bottom thereof in substantial alignment with the median of the apex angle so as to bias the base 18 into self aligning abutting engagement with the outer hub 28 of the wheel 29. This will ensure that the axis $x—x$ of the level 11 is automatically aligned parallel with the axis of wheel 29 and consequently perpendicular to the plane $w—w$ of the pivoted axle mounted wheel 29.

Assuming the floor is level, the tires equally inflated, and the wheel 29 is straight ahead, then the reading of the center of bubble B on the left hand or camber scale will directly indicate the camber angle of wheel 29 which is the departure of the center plane $w—w$ of the wheel 29 from the vertical as indicated in FIG. 4.

To determine the caster angle, the wheel 29 may be first turned outwardly until the guide formed by the rear edge of the calibration plate 13 as well as the rear side of frame 12 is aligned perpendicularly to the straight ahead direction of the wheel, i.e. to the side 31 of the automobile as indicated schematically in FIG. 5. It has been found that this can be accomplished easily and with a relatively high degree of accuracy even by an inexperienced person. In this position of the wheel, a reading of the center of bubble B on the right hand or caster scale of the calibration plate 13 is made. Then the wheel 29 is turned inwardly until the guide formed by the forward edge of plate 13 as well as the forward side of frame 12 is aligned perpendicularly to the straight ahead direction of the wheel, i.e. to the side 31 of the automobile as indicated schematically in FIG. 6. Thereupon a second reading of the center of the bubble B on the caster scale of the calibration plate 13 is made. The difference between the two readings is the caster and if the first is larger than the angle is positive.

In order to accomplish this result, the right hand or caster scale on the calibration plate 13 must be calibrated as a sine function of the apex angle of the calibration plate 13 and hence of the frame 12. To coordinate the two scales and thereby avoid confusion the apex angle A of the guide elements preferably is made 29 degrees so that the sum of the sine functions of each half thereof is substantially .5. As a result the caster scale becomes just half the camber scale as indicated in FIG. 1 but with the zero displaced so as to utilize the full length of the elongated level 11 for the two differential caster readings. Thus the ratio of the camber and caster scales is a geometric function of the apex angle between the guide elements formed by the edges of the calibration plate 13 and also by the sides of the frame 12.

Although I have described a preferred embodiment of the invention many modifications can be made. It is to be understood therefore, that I intend by the appended claims to cover all those modifications within the true scope and spirit of the invention.

I claim:

1. In a camber and caster gauge for a pivoted axle mounted wheel provided with a holding nut, a bubble level, a supporting frame therefor having a centrally arched base perpendicular to the axis of the level, a screw clamp for attachment to the holding nut, and a tension spring interconnected between the clamp and the frame for biasing the centrally arched base to straddle the axle in self-aligning abutting engagement with the hub of the wheel.

2. In a camber and caster gauge for a pivoted axle mounted wheel, a symmetrical wedge shaped open box frame having a flat base substantially perpendicular to the axis of symmetry and centrally arched to straddle the wheel axle and provided with means for biasing the base into self-adjusting engagement with the hub of the wheel, said means including an elastic element connected under tension between the wheel axle and a point within the open box frame, and an elongated arcuated bubble level fixed in position on the frame medial between the tapering sides thereof with the plane of curvature of the level perpendicular to the arched base.

3. In a gauge of the character described, a wedge shaped open bottom box frame having a base centrally arched to straddle the axle of a pivoted axle wheel and an isosceles triangular top provided with camber and caster scales extending along opposite sides of the bisector of the apex angle, an elongated arcuate bubble level fixed in position between the scale integral with the top, and a tension spring having one end connected to a point within the open bottom box frame adjacent the apex and the other end provided with a clamp connectable with the wheel axle for tensioning the spring to bias the base into self-adjusting engagement with the hub of the wheel to guide equiangular turns of the wheel from the straight ahead direction upon successive alignment of the tapering sides of the frame perpendicular to the straight ahead direction.

4. In a gauge of the character described, an isosceles tirangular open bottom box frame having a base and a medial concave rib to form a groove at the top bisecting the apex angle, an elongated arcuate bubble level fixed in position in the groove with the plane of curvature of the level perpendicular to the base, a top cover plate having a slot extending lengthwise of the level and provided with the camber and caster scales on opposite sides of the slot, and means for biasing the base into self-adjusting engagement with the hub of the wheel, said means including an elastic element connected under tension between the wheel axle and a point within the open box frame.

References Cited in the file of this patent

UNITED STATES PATENTS

| | | |
|---|---|---|
| 2,115,347 | Sutton | Apr. 26, 1938 |
| 2,177,669 | Martin | Oct. 31, 1939 |
| 2,194,995 | Bergquist | Mar. 26, 1940 |
| 2,608,000 | Castiglia | Aug. 26, 1952 |
| 2,781,587 | Haucke | Feb. 19, 1957 |
| 2,831,265 | Weaver | Apr. 22, 1958 |